United States Patent [19]

Gilbert et al.

[11] 4,297,444

[45] Oct. 27, 1981

[54] PROCESS FOR RIM ELASTOMERS WITH SUPERIOR HIGH TEMPERATURE DIMENSIONAL STABILITY

[75] Inventors: Richard G. Dominguez, Doris M. Rice, both of Austin, Tex.

[73] Assignee: Texaco Development Corp., White Plains, N.Y.

[21] Appl. No.: 120,238

[22] Filed: Feb. 11, 1980

[51] Int. Cl.$^3$ ............ C08G 18/14; C08G 18/76; C08G 18/10; C08G 18/82

[52] U.S. Cl. ................ 521/160; 521/174; 528/65; 528/66; 528/67; 528/77; 528/503

[58] Field of Search .......... 521/174, 160; 528/65, 528/66, 67, 77

[56] References Cited

U.S. PATENT DOCUMENTS

| | | | |
|---|---|---|---|
| 4,048,105 | 9/1977 | Salisbury | 260/2.5 AC |
| 4,065,410 | 12/1977 | Schaefer et al. | 260/2.5 AM |
| 4,190,711 | 2/1980 | Zdrahala et al. | 521/112 |
| 4,218,543 | 8/1980 | Weber et al. | 521/160 |

Primary Examiner—H. S. Cockeram
Attorney, Agent, or Firm—Carl G. Ries; Robert A. Kulason; Kenneth R. Priem

[57] ABSTRACT

The invention is a method for making reaction injection molded polyurethane of improved properties. The product ccomprises the reaction product of a high molecular weight polyhydric polyether, a low molecular weight active hydrogen containing compound of at least two functionality and a polyisocyanate wherein at least about 30% of the high molecular weight polyether is first mixed and allowed to react with the polyisocyanate and then the remaining polyhydric polyether and low molecular weight active hydrogen containing compound are added to the polyether and polyisocyanate mixture and allowed to react. Reaction injection molded elastomers are useful as molded articles of commerce including, but not limited to, vehicle body parts.

17 Claims, No Drawings

PROCESS FOR RIM ELASTOMERS WITH SUPERIOR HIGH TEMPERATURE DIMENSIONAL STABILITY

BACKGROUND OF THE INVENTION

1. Field of the Invention

The invention concerns the field of reaction injection molded polyurethanes.

2. DESCRIPTION OF THE PRIOR ART

Reaction Injection Molding (RIM) is a technique for the rapid mixing and molding of large, fast curing urethane parts. RIM polyurethane parts are used in a variety of exterior body applications on automobiles where their light weight contributes to energy conservation. RIM parts are generally made by rapidly mixing active hydrogen containing materials with polyisocyanate and placing the mixture into a mold where reaction proceeds. These active hydrogen containing materials comprise a high molecular weight polyhydric polyether and a low molecular weight active hydrogen containing compound. After reaction and demolding, the parts may be subjected to an additional curing step which comprises placing the parts in an ambient temperature of about 250° F. or greater.

Usual practice is to place all components except the isocyanate in one vessel and the isocyanate in another vessel (called the A component) prior to reaction and then mixing the A and B components together in the desired stoichiometric balance in a mold as discussed above. H. Peebles, Jr., Macromolecules 9 (1), pp. 58–61 discusses hard segment molecular weight distribution of a one stage thermoplastic polyurethane synthesis compared with a two stage synthesis. However, RIM is not discussed.

It has been surprisingly discovered that significant advantages occur when a significant portion or all of the high molecular weight polyhydric polyether is reacted with a portion of the isocyanate before the low molecular weight active hydrogen containing compound and the remaining high MW polyhydric polyether is mixed with the remaining unreacted isocyanate and the prereacted polyether and isocyanate and allowed to react.

SUMMARY OF THE INVENTION

The invention is a method for making reaction injection molded polyurethane of improved properties. The product comprises the reaction product of a high molecular weight polyhydric polyether (polyol), a low molecular weight active hydrogen containing a compound of at least 2 functionality and a polyisocyanate wherein at least 30% of the high molecular weight polyether is prereacted with a portion or all of the polyisocyanate then this reaction product and any remaining polyisocyanate is mixed with the remaining high molecular weight polyether and low molecular weight active hydrogen containing compound and allowed to react. The invention is also the resulting RIM polyurethane composition.

DESCRIPTION OF THE PREFERRED EMBODIMENTS

There are two aspects to high temperature dimensional stability of RIM polyurethane parts. First droop or sag of the molded article, when subjected to high temperature, and, second, permanent shrinkage or expansion of part dimensions as a consequence of exposure to elevated temperatures. We have found that by prereacting a significant portion of the high molecular weight polyol with the isocyanate before the other components are reacted with the isocyanate results in an improvement in both aspects of thermal dimensional stability discussed above. In fact, the greater the amount of prereacted polyol in the resulting elastomer, the greater the improvement of these properties. The ultimate property improvement occurs when virtually all or all of the polyol is prereacted with the isocyanate.

The polyols useful in the process of this invention include polyether polyols, polyester diols, triols, tetrols, etc., having an equivalent weight of at least 500, and preferably at least 1000 up to about 3000. Those polyether polyols based on trihydric initiators of about 4000 molecular weight and above are especially preferred. The polyethers may be prepared from lower alkylene oxides such as ethylene oxide, propylene oxide, butylene oxide or mixtures of propylene oxide, butylene oxide and/or ethylene oxide. In order to achieve the rapid reaction rates which are normally required for molding RIM polyurethane elastomers, it is preferable that the polyol be capped with enough ethylene oxide to increase the reaction rate of the polyurethane mixture. Normally at least 50% primary hydroxyl is preferred, although amounts of primary hydroxyl less than this are acceptable if the reaction rate is rapid enough to be useful in industrial application. Other high molecular weight polyols which may be useful in this invention are polyesters or hydroxyl terminated rubbers (such as hydroxyl terminated polybutadiene). Hydroxyl terminated quasi-prepolymers of polyols and isocyanates are also useful in this invention.

The chain-extenders useful in the process of this invention are preferably difunctional. Mixtures of difunctional and trifunctional chain-extenders are also useful in this invention. The chain-extenders useful in this invention include diols, amino alcohols, diamines or mixtures thereof. Low molecular weight linear diols such as 1,4-butanediol and ethylene glycol have been found suitable for use in this invention. Ethylene glycol is especially preferred. Other chain-extenders including cyclic diols such as 1,4-cyclohexane diol and ring containing diols such as bishydroxyethylhydroquinone, amide or ester containing diols or amino alcohols, aromatic diamines and aliphatic amines would also be suitable as chain-extenders in the practice of this invention.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, napthalene-1,4-diisocyanate, bis(4-isocyanatophenyl)methane, bis(3-methyl-3-isocyantophenyl)methane, bis-(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi- are prepolymers of MDI, modified pure MDI, etc. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally uretonimine modified pure MDI is included also. This product is made by heating pure distilled MDI in the presence of a catalyst. The liquid product is a mixture of pure MDI and modified MDI:

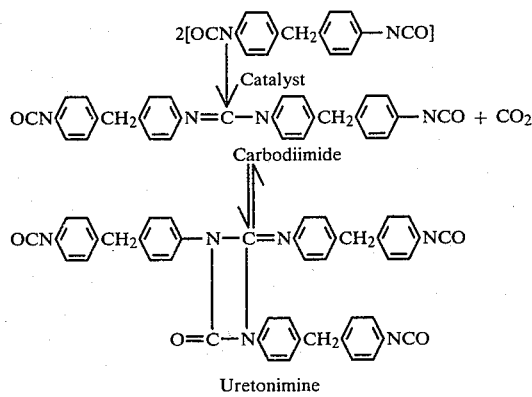

Examples of commercial materials of this type are Upjohn's ISONATE® 125M (pure MDI) and ISONATE® 143L ("liquid" MDI). Preferably the amount of isocyanates used is the stoichiometric amount based on all the ingredients in the formulation or greater than the stoichiometric amount.

The portion of the high molecular weight polyol which is prereacted with the polyisocyanate may be reacted in several ways. In the examples which follow, the polyol which was to be incorporated into the A-component was prereacted with an equal weight of polyisocyanate and then this reacted mixture was incorporated with the remaining amount of isocyanate in the A-component. In another embodiment of my invention, the polyol is added to the total amount of isocyanate in the A-component and reacted. Each of these techniques of prereacting the polyol with the isocyanate will give similar results as will other methods apparent to those skilled in the art.

The RIM formulation includes a great number of other recognized ingredients such as additional cross-linkers—catalysts, extenders, blowing agents and the like. Blowing agents may include halogenated low-boiling hydrocarbons, such as trichloromonofluoromethane and methylene chloride, carbon dioxide, nitrogen, etc., used.

Catalysts such as tertiary amines or an organic tin compound or other polyurethane catalysts may be used. The organic tin compound may suitably be a stannous or stannic compound, such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, dibutyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g. trimethylamine, triethylamine), heterocyclic amines, such as N-alkylmorpholines (e.g., N-methylmorpholine, N-ethylmorpholine, dimethyldiaminodiethylether, etc.), 1,4-dimethylpiperazine, triethylenediamine, etc., and aliphatic polyamines, such as N,N,N'N'-tetramethyl-1,3-butanediamine.

Other conventional formulation ingredients may also be employed, such as, for example, foam stabilizers, also known as silicone oils or emulsifiers. The foam stabilizer may be an organic silane or siloxane. For example, compounds may be used having the formula:

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773.

Although not essential for the practice of this invention, the use of commonly known additives which enhance the color or properties of the polyurethane elastomer may be used as desired. For example, chopped or milled glass fibers, chopped or milled carbon fibers and/or other mineral fibers are useful.

In a preferred embodiment of this invention, a high molecular weight polyether polyurethane polyol of about 5000 molecular weight or above is combined with a stoichiometric excess of 4,4'-diphenylmethane diisocyanate (MDI) and allowed to react in the presence of a tin base catalyst. This is known as the A component. A B component comprising ethylene glycol, a silicone surfactant, a tin catalyst and an amine catalyst is mixed together with the A component in a suitable mold. After reaction of the A and B components, the resulting polyurethane part is post cured at a temperature of 325° F. for about one half of an hour. In another preferred embodiment of this invention, the polyol is prereacted with an equal weight of polyisocyanate before the entire formulation is reacted and cured as above. As will be shown in the data below, such a procedure causes a striking improvement in heat sag over procedures of the prior art where the polyol was not prereacted with isocyanate. The following examples demonstrate the invention. They are not to be construed as limiting the invention in any way, but merely to be exemplary of the improvement and manner in which the invention may be practiced.

A glossary of terms and materials used in the following examples follows the examples.

In the examples, pre-reacted polyol in the A-component means polyol showing up as quasi-prepolymer on the A-side. The quasi-prepolymer used is a 50/50 by weight blend of ISONATE 143L (Upjohn) and THANOL® SF-5505 polyether polyol (Jefferson). Therefore, for a given elastomer formulation, more and more polyol is removed from the B-component and is included in the A-component in the form of pre-reacted quasi-prepolymer as this invention is practiced. The ultimate advantage occurs where all the polyol appears on the A-side and only chain extender and additives compose the B-component.

EXAMPLE I

THANOL SF-5505 (18.8 pbw), ethylene glycol (6.44 pbw), L 5430 silicone oil (0.2 pbw), THANCAT® DMDEE (0.25 pbw), dibutyltin dilaurate (0.015 pbw), and FOAMREZ® UL-29 (0.025 pbw) were premixed and charged into the B-component working tank of a Cincinnati Milacron LRM-2 impingement mix RIM machine. ISONATE 143L (32.07 pbw) was charged into the A-component working tank. The A-component temperature was adjusted to 80° F. and the B-component temperature was adjusted to 120° F. The machine was set to deliver the components at an injection rate of 3 lbs/sec. and at a weight ratio of 0.802 B-component/A-component. This corresponds to an isocyanate index of 1.00. The components were then injected at an impingement pressure of approximately 1200 psi on the B-component and 600 psi on the A component into a steel plaque mold cavity having dimensions of 0.125 inches by 24 inches by 48 inches. The mold temperature was set at 150° F. The parts were released in 60 seconds from the commencement of pour. The plaques had a specific gravity of about 1.1.

A number of identical plaques were prepared and post-cured within 15 minutes from pour for ½ hour at 250° F. and 325° F. After one week's rest at 75° F. and 50% relative humidity, the physical and thermal properties of the elastomer were measured. These are reported in Table I. This example is an elastomer with no pre-reacted polyol in the A-component in the form of Quasi-prepolymer.

EXAMPLE II

In the same way as outlined in Example I, the following ingredients were charged into their respective working tanks:

| B-Component | | |
| --- | --- | --- |
| THANOL SF 5505 | 16 | pbw |
| Ethylene glycol | 6.44 | pbw |
| L 5430 silicone oil | 0.2 | pbw |
| THANCAT DMDEE | 0.25 | pbw |
| FOAMREZ UL-29 | 0.025 | pbw |
| Dibutyltin Dilaurate | 0.015 | pbw |
| A-Component | | |
| THANATE® Quasi-prepolymer L55-0 | 5.63 | pbw |
| ISONATE 143L | 29.06 | pbw |

These components were then Reaction Injection Molded and experiments were performed on the resulting elastomers as in Example I. The weight ratio B/A was 0.661 for a 1.00 Isocyanate index. Physical and thermal properties are reported in Table I. In this example, a small amount of polyol (about 15%) appears in the A side in the form of quasi-prepolymer.

EXAMPLE III

In the same way as outlined in Example I, the following ingredients were charged into their respective working tanks:

| B-Component | | |
| --- | --- | --- |
| THANOL SF 5505 | 12.5 | pbw |
| Ethylene glycol | 6.44 | pbw |
| L 5430 silicone oil | 0.2 | pbw |
| THANCAT DMDEE | 0.25 | pbw |
| FOAMREZ UL-29 | 0.025 | pbw |
| dibutyltin dilaurate | 0.015 | pbw |
| A-Component | | |
| THANATE Quasi-prepolymer L 55-0 | 12.66 | pbw |
| ISONATE 143L | 25.54 | pbw |

These components were Reaction Injection Molded and experiments were performed on the resulting elastomers as in Example I. The weight ratio B/A was 0.509 for a 1.00 Isocyanate index. Physical and thermal properties are reported in Table I. In this example, considerably more polyol (about 34%) appears on the A side as quasi-prepolymer than in Example II.

EXAMPLE IV

In the same was as outlined in Example I, the following ingredients were charged into their respective working tanks:

| B-Component | | |
| --- | --- | --- |
| Ethylene glycol | 6.44 | pbw |
| L 5430 silicone oil | 0.2 | pbw |
| THANCAT DMDEE | 0.15 | pbw |
| A-Component | | |
| THANATE Quasi-prepolymer L 55-0 | 37.31 | pbw |
| ISONATE 143L | 12.94 | pbw |
| FOAMAREZ UL-29 | 0.015 | pbw |
| Dibutyltin Dilaurate | 0.01 | pbw |

These components were Reaction Injection Molded on an Admiral 40 lb. per min. low pressure mechanical mix machine. Experiments were performed on the resulting elastomers as in Example I. The weight ratio B/A was 0.135 for a 1.00 Isocyanate index. Physical and thermal properties are reported in Table I. This is an example of an elastomer produced with all the polyol on the A-side.

In summary, going from Example I to Example IV, there is no polyol on the A-side (Example I), about 15% of the polyol on the A-side (Example II), about 34% of the polyol on the A-side (Example III), and all the polyol on the A-side (Example IV). Polyol is introduced on the A-side in the form of THANCAT Quasi-prepolymer L 55-0. This quasi-prepolymer is made by reacting 50/50 wt. % of THANOL SF 5505 polyether polyol with ISONATE 143L isocyanate. Thus, it contains polyol that is prereacted with the isocyanate, making the polyol isocyanate terminated and consequently highly reactive with the chain extender (ethylene glycol). Please note that all the preceding four examples are equivalent from the point of view of the percentage each component is represented at in the resulting elastomer. The only exception to this is Example IV where a little less tin catalyst is present in order to facilitate processing. However, the percent polyol, ethylene glycol and isocyanate is identical in all four examples. The basic difference, then, lies in the way that the components are reacted together, namely increasing amounts of polyol prereacted with isocyanate and included in the A-component.

is very important in production where it is very difficult to control oven temperatures closely.

Also, when all the polyol is in the form of quasi-prepolymer (Example IV), the best overall heat sag (a measure of droop for an unsupported projection of the material) is obtained measured at 250° F. and 325° F. for both postcure conditions. Thus, this elastomer's (Example IV) performance at elevated temperature is less

TABLE I

|  | Example I | | Example II | | Example III | | Example IV | |
|---|---|---|---|---|---|---|---|---|
| Post cure conditions | ½ hr at 250° F. | ¼ hr at 325° F. | ½ hr at 250° F. | ¼ hr at 325° F. | ½ hr at 250° F. | ¼ hr at 325° F. | ½ hr at 250° F. | ¼ hr at 325° F. |
| Percent polyol on "A" side | 0% | | 15% | | 34% | | 100% | |
| Isocyanate Index | 1.00 | 1.00 | 1.00 | 1.00 | 1.00 | 1.00 | 1.00 | 1.00 |
| Properties: | | | | | | | | |
| Heat sag, 4" overhang 250° F. for 1 hr, inches | 0.24 | 0.025 | 0.375 | 0.06 | 0.21 | 0.065 | 0.106 | 0.06 |
| Heat sag, 6" overhang 325° F. for ¼ hr, inches | >4 | 0.765 | >4 | 1.60 | >4 | 1.1 | 1.64 | 0.67 |
| Shrinkage (−) or expansion (+) in % of cold mold dimensions | −1.25 | −0.14 | −1.23 | +0.08 | −1.47 | −0.73 | −1.38* | −1.38* |
| Percentage shrinkage difference | 88.8% | | 106% | | 50% | | 0% | |
| Tensile, psi | 4825 | 4370 | 4953 | 4950 | 4663 | 4651 | 5064 | 5119 |
| Elongation % | 192 | 178 | 198 | 167 | 173 | 177 | 153 | 137 |
| Tear, pli | 592 | 551 | 597 | 539 | 615 | 594 | 702 | 648 |
| Flexural Modulus, psi × $10^3$ | | | | | | | | |
| (a) 75° F. | 91.3 | 85.0 | 99.7 | 84.0 | 95.3 | 92.8 | 115.1 | 111.6 |
| (b) −20° F. | 168.2 | 150.2 | 188.1 | 147.7 | 219.4 | 186.7 | 267.8 | 213.4 |
| (c) 158° F. | 50.7 | 51.2 | 50.3 | 51.0 | 49.4 | 57.7 | 59.3 | 63.9 |
| (d) 325° F. | 11.8 | 15.6 | 14.6 | 14.3 | 15.7 | 18.2 | 22.5 | 27.3 |
| Izod Impact ft-lbs/in notch | 10.25 | 9.57 | 9.83 | 9.32 | 8.84 | 9.37 | 13.0 | 9.5 |

*Measured vs. a hot steel mold (150° F.)

As can be seen from Table I, the more polyol introduced on the A side in the form of quasi-prepolymer, the closer are the shrinkage factors after 250° F. postcure and 325° F. postcure. In fact, in Example IV, the shrinkage factors at the two postcure conditions are the same. This means that as increasing amounts of polyol is prereacted with the isocyanate part dimensions are less affected by thermal history. This is highly significant because it is very desirable that part dimensions not vary as a function of thermal history. Shrinkage/expansion is measured after the part has cooled for about 1 hour from the postcure cycle. Thus, since in Examples I and II we have very different shrinkage factors after 250° F. postcure vs. 325° F. postcure, these formulations will produce parts with very different dimensions depending on individual thermal history. The difference in shrinkage factor is much less for Example III, which has a relatively high quasi-prepolymer content. As noted above, the difference is zero for Example IV. Thus, for Example IV, part dimensions are independent of thermal history within the range studied. This feature dependent on postcure conditions than the other three examples. In summary, our results indicate that the more polyol present in the form of quasi-prepolymer for an overall constant formulation (wt.% of ingredients constant) the less sensitive are the thermal performance properties and overall dimensions to in-use conditions and thermal history.

When all the polyol is present in the form of quasi-prepolymer in a given formulation, (Example IV), the green strength is also remarkably improved. This can best be seen by comparing the properties of this elastomer (Example IV) with the properties of an elastomer of identical formulation but with all the polyol present in the conventional form (that is, not pre-reacted with isocyanate and consequently present on the B-side).

TABLE II

| Elastomer from Example IV | | | | | | |
|---|---|---|---|---|---|---|
| All the polyol in this elastomer is present in the form of quasi-prepolymer, that is, pre-reacted with isocyanate and thus in the A-component. | | | | All the polyol in this elastomer is present in the form of conventional polyol, and is contained in the B-component in the conventional manner. | | |
| Postcure conditions | No post cure | Post cured ½ hr at 250° F. | Post cured ½ hr at 325° F. | No post cure | Post cured ½ hr at 250° F. | Post cured ½ hr at 325° F. |
| Tensile, psi | 5405 | 5064 | 5119 | 4211 | 4602 | 4768 |
| Elongation, % | 137 | 153 | 137 | 100 | 144 | 155 |
| Tear, pli | 690 | 702 | 648 | 530 | 564 | 572 |
| Isocyanate Index | 1.00 | 1.00 | 1.00 | 1.00 | 1.00 | 1.00 |

From Table II it is clear that tensile strength and tear strength are much improved for an elastomer made by the method of this invention. By the method of this invention, the un-postcured elastomer (green) has the best overall strength properties, whereas by the prior art method the "green" (unpostcured) elastomer has significantly inferior properties when compared with post cured elastomers. For this reason, elastomers made by the method of this invention have excellent "green strength" which is very desirable since this decreases cycle time (a very important economic consideration), decreases the possibility of parts tearing upon demolding and decreases the danger of part damage in handling before post cure.

GLOSSARY OF TERMS AND MATERIALS

RIM—Reaction Injection Molding

Polyol—A di or greater functionality high molecular weight alcohol terminated molecule composed of ether groups such as ethylene, propylene, butylene, etc., oxides.

MDI—4,4' diphenyl methane diisocyanate

ISONATE 143L—Pure MDI isocyanate modified so that it is a liquid at temperatures where MDI crystallizes—product of the Upjohn Co.

PAPI 901—A crude form of MDI containing about 30% higher functionality isocyanates and other impurities—product of the Upjohn Co.

ISONATE 191—Thought to be a 50/50 blend of Isonate 143L and PAPI 901—product of the Upjohn Co.

Quasi-prepolymer L-55-0—A quasi-prepolymer formed by reacting equal weights of ISONATE 143L and THANOL SF-5505.

Quasi-prepolymer P-55-0—A quasi-prepolymer formed by reacting equal weights of PAPI 901 and THANOL SF-5505.

Quasi-prepolymer L-(5145-85)-0—A quasi-prepolymer formed by reacting equal weights of ISONATE 143L and experimental polyol 5145-85.

THANOL SF-5505—a 5500 molecular weight polyether triol containing approximately 80% primary hydroxyl groups.

THANOL SF-6503—A 6500 molecular weight polyether triol containing oxyethylene groups and approximately 90% primary hydroxyl groups.

L5430 Silicone Oil—A silicone glycol copolymer surfactant containing reactive hydroxyl groups. Product of Union Carbide.

THANCAT DMDEE—Dimorpholinodiethylether

FOAMREZ UL-29—A stannic diester of a thiol acid. The exact composition is unknown. Product of Witco Chemical Co.

Fluorocarbon 11-B—An inhibited trichlorofluoromethane.

We claim:

1. In a method for making a polyurethane elastomer wherein an aromatic polyisocyanate, a polyether polyol based on trihydric initiators of about 4000 molecular weight and above and a chain extending agent comprising a low molecular weight active hydrogen containing compound of at least 2 functionality is injected via a RIM machine into a mold cavity of the desired configuration the improvement which comprises mixing at least 30% of said polyether polyol with the entire amount of polyisocyanate and allowing them to react, adding the remaining polyether polyol and low molecular weight active hydrogen containing compound to the polyol and polyisocyanate reacted mixture and injecting this entire mixture into the mold cavity where it is allowed to react.

2. A method as in claim 1 wherein the polyol comprises a polyether of about 5000 molecular weight based on a trihydric initiator.

3. A method as in claim 1 wherein the polyisocyanate comprises 4,4'diphenylmethane diisocyanate.

4. A method as in claim 1 wherein the elastomer is postcured at about 325° F.

5. A method as in claim 1 wherein all of the polyol is prereacted with polyisocyanate prior to injecting the entire mixture into the mold.

6. In a method for making a polyurethane elastomer wherein an aromatic polyisocyanate, a polyether polyol based on trihydric initiators of about 4000 molecular weight and above and a chain extending agent comprising a low molecular weight active hydrogen containing compound of at least 2 functionality is injected via a RIM machine into a mold cavity of the desired configuration the improvement which comprises mixing all of said polyether polyol with the entire amount of polyisocyanate and allowing them to react then adding the low molecular weight active hydrogen containing compound to the polyol-polyisocyanate reaction product and injecting this mixture into the mold cavity where it is allowed to react.

7. In a method for making a polyurethane elastomer wherein an aromatic polyisocyanate, a polyether polyol based on trihydric initiators of about 4000 molecular weight and above and a chain extending agent comprising a low molecular weight active hydrogen containing a compound of at least 2 functionality is injected via a RIM machine into a mold cavity of the desired configuration the improvement which comprises prereacting at least about 30% of said polyether polyol with a portion of the polyisocyanate and allowing them to react and mixing with this reaction product the remaining polyisocyanate, the remaining polyether polyol and the low molecular weight active hydrogen containing compound and injecting this mixture into the mold cavity where it is allowed to react.

8. A method as in claim 7 wherein the polyol comprises a polyether of about 5000 molecular weight based on a trihydric initiator.

9. A method as in claim 7 wherein the polyisocyanate comprises 4,4'diphenylmethane diisocyanate.

10. A method as in claim 7 wherein the elastomer is postcured at about 325° F.

11. A method as in claim 7 wherein all of the polyol is prereacted with polyisocyanate prior to injecting the entire mixture into the mold.

12. In a method for making a polyurethane elastomer wherein an aromatic polyisocyanate, a polyether polyol based on trihydric initiators of about 4000 molecular weight and above and a chain extending agent comprising a low molecular weight active hydrogen containing a compound of at least 2 functionality is injected via a RIM machine into a mold cavity of the desired configuration the improvement which comprises prereacting all of said polyether polyol with a portion of the polyisocyanate and allowing them to react and mixing with this reaction product the remaining polyisocyanate and the low molecular weight active hydrogen containing compound and injecting this mixture into the mold cavity where it is allowed to react.

13. In a method for making a polyurethane elastomer wherein an aromatic polyisocyanate, a polyether polyol based on trihydric initiators of about 4000 molecular weight and above and a chain extending agent comprising a low molecular weight active hydrogen containing a compound of at least 2 functionality is injected via a RIM machine into a mold cavity of the desired configuration the improvement which comprises prereacting at least about 30% of said polyether polyol with a portion of the polyisocyanate and allowing them to react, adding this reaction product to the remaining polyisocyanate to form an A component, mixing the remaining polyol and low molecular weight active hydrogen containing compound to form a B component, mixing the A and B components and injecting the mixture into the mold cavity where it is allowed to react.

14. A method as in claim 13 wherein the polyol comprises a polyether of about 5000 molecular weight based on a trihydric initiator.

15. A method as in claim 13 wherein the polyisocyanate comprises 4,4′diphenylmethane diisocyanate.

16. A method as in claim 13 wherein the elastomer is postcured at about 325° F.

17. A method as in claim 13 wherein all of the polyol is prereacted with polyisocyanate prior to injecting the entire mixture into the mold.

* * * * *